United States Patent [19]
Lafferty

[11] Patent Number: 5,673,593
[45] Date of Patent: Oct. 7, 1997

[54] OVERRUNNING NUT FOR LINEAR ACTUATOR

[75] Inventor: Scott G. Lafferty, Mosinee, Wis.

[73] Assignee: Joerns Healthcare, Inc., Stevens Point, Wis.

[21] Appl. No.: 572,121

[22] Filed: Dec. 14, 1995

[51] Int. Cl.⁶ ............................................. F16H 25/20
[52] U.S. Cl. ............................ 74/424.8 R; 74/89.15; 192/141
[58] Field of Search ........................... 74/89.15, 424.8 R; 192/141

[56] References Cited

U.S. PATENT DOCUMENTS

| | | |
|---|---|---|
| 2,502,674 | 4/1950 | Sellers . |
| 2,660,281 | 11/1953 | Ochtman ................. 192/141 |
| 2,852,115 | 9/1958 | O'Neill . |
| 3,244,038 | 4/1966 | Lacy ................. 74/424.8 R X |
| 3,277,736 | 10/1966 | Goodman ................. 192/141 X |
| 3,732,744 | 5/1973 | Rowland . |
| 4,041,793 | 8/1977 | Repay et al. ................. 74/424.8 R |
| 4,212,379 | 7/1980 | Zoino . |
| 4,425,814 | 1/1984 | Dick . |
| 4,440,035 | 4/1984 | Foulk . |
| 4,534,234 | 8/1985 | Cosenza ................. 74/89.15 |
| 4,672,858 | 6/1987 | Langowski . |
| 4,846,011 | 7/1989 | Gaffney . |
| 4,920,816 | 5/1990 | Inabe et al. . |
| 4,966,045 | 10/1990 | Harney . |
| 5,345,835 | 9/1994 | Schabert et al. . |
| 5,461,935 | 10/1995 | Hill ................. 192/141 X |

Primary Examiner—Rodney H. Bonck
Attorney, Agent, or Firm—Price, Heneveld, Cooper, DeWitt & Litton

[57] ABSTRACT

A simple, inexpensive and reliable screw type linear actuator includes a drive screw, a nut disposed thereon, and a reciprocating drive tube radially disposed over at least a portion of the drive screw. A first clutch member has a first clutch surface bearing upon a complimentary clutch surface which is operatively connected to the drive tube, whereby outboard movement of the nut upon rotation of the drive screw causes the first clutch surface on the first clutch member to bear upon the complimentary clutch surface and urge the drive tube in a direction toward the outboard end of the drive screw. A compression member urges the first clutch member axially away from the nut, and a retainer allows only limited axial movement of the nut with respect to the drive screw, whereby the nut and the first clutch member are always maintained in splined engagement. The resulting arrangement provides an overrunning nut which relies on a clutch mechanism, and a compression member which exerts a separating force between the clutch mechanism and the nut to ensure that the amount of torque needed to cause the nut to overrun always exceeds the frictional torque between the drive screw and the nut, irrespective of the axial load or force which is applied to the linear actuator.

23 Claims, 3 Drawing Sheets

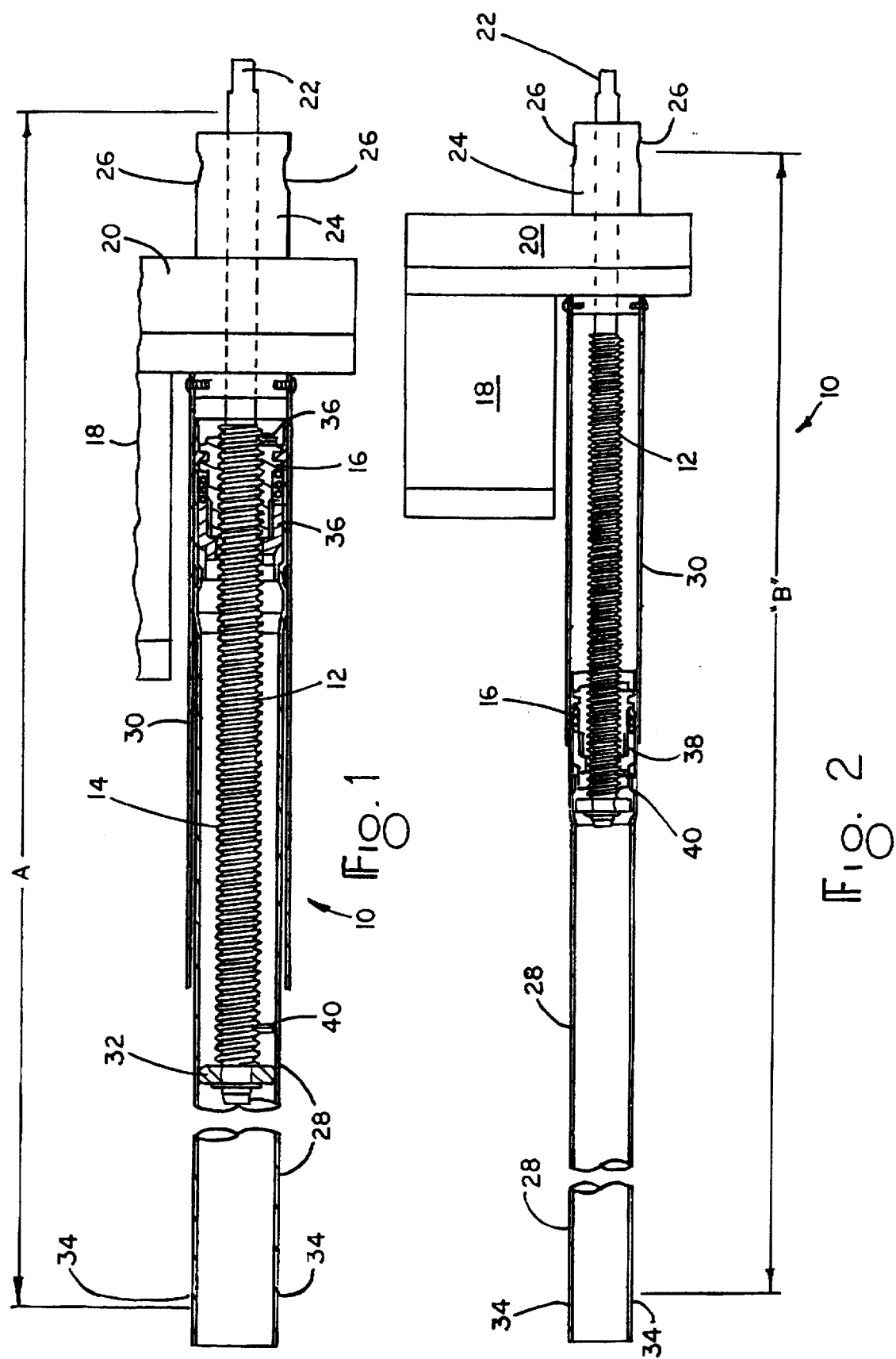

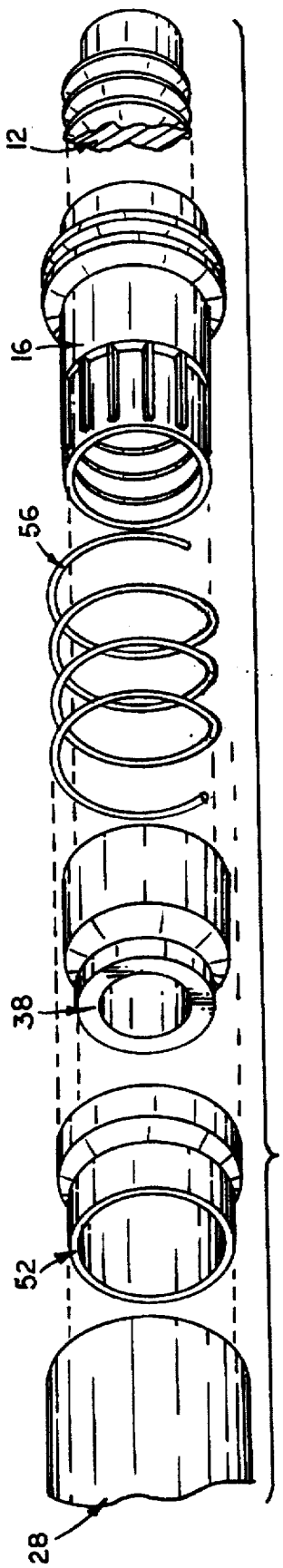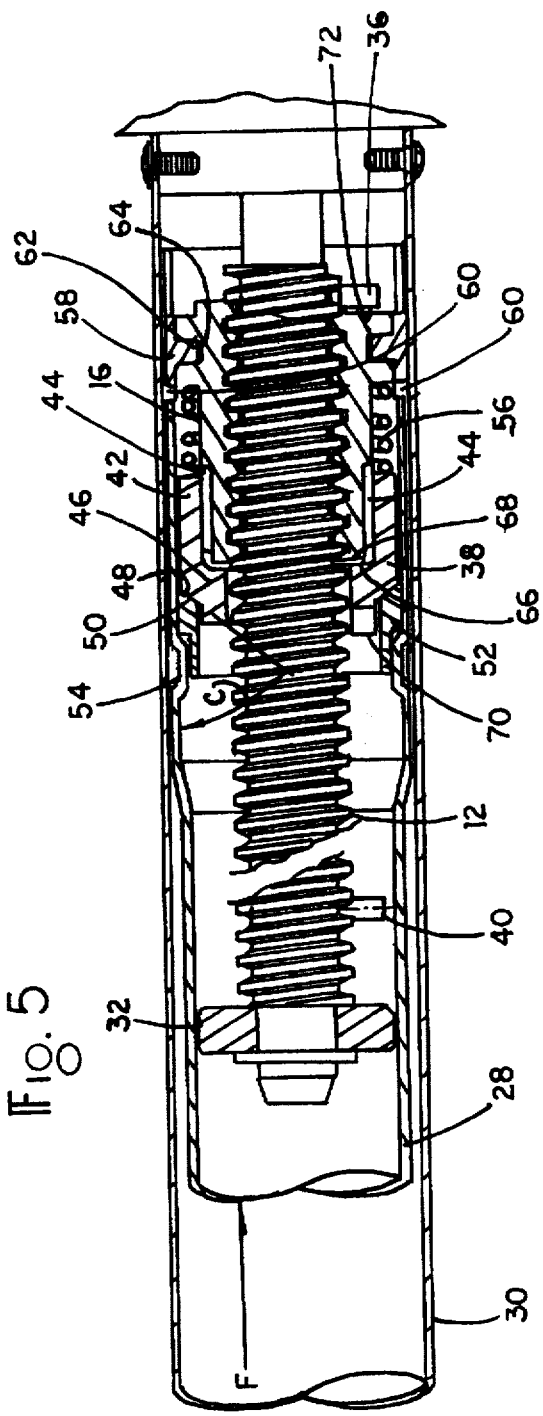

5,673,593

OVERRUNNING NUT FOR LINEAR ACTUATOR

BACKGROUND OF THE INVENTION

This invention relates to linear actuators for effecting and controlling longitudinal movement of a component in a mechanical device such as articulated beds and the like, and more particularly to screw drive type linear actuators having an overrunning nut which allows slippage between a member rotatively coupled with the nut and a drive tube at the stops or limits of linear travel of the actuator, thereby preventing damage hereto.

Linear actuators are commonly utilized in a variety of mechanical devices, such as garage door openers, construction, material handling and farming equipment, medical and dental devices, articulated beds, motion furniture for consumer and health care markets, the positioning of airplane wing flaps and rudders, etc. The screw drive type linear actuators consist of a drive screw or an externally threaded shaft journalled for rotational movement about its longitudinal axis within a stationary portion of the actuator, and a nut having internal threads which engage the external threads of the drive screw. The nut is operatively connected to a drive tube, which is connected to a component of a mechanical device. Rotary motion of the drive screw is translated into linear motion of the nut through the meshed threads thereof. The linear motion of the nut it transmitted to the drive tube and ultimately to the component of a mechanical device which is to be positioned by the linear actuator. The drive screw can be rotated by any conventional rotatory drive means, such an electric motor, internal combustion engine, pneumatic or hydraulic motor, hand crank, etc.

At either end of the desired travel of the nut and drive tube, the nut encounters a stop and cannot continue to traverse the rotating screw without causing damage to the linear actuator, drive means, or the device upon which the actuator operates. In order to prevent such damage or mechanical failure, various sophisticated sensing devices, such an magnetic and electro-optical sensors, have been used in conjunction with computer controllers to limit the amount of travel of the nut along the drive screw. Although such sensors and control means can provide precise control of automated drive means, these devices the generally unacceptable for many commodity type applications on account of their complexion and high cost.

Another common means of preventing damage or mechanical failure of the linear actuator, drive means and the device upon which the actuator operates, is to provide a linear actuator design wherein the nut is allowed to rotate with the drive screw and slip relative to the drive tube when the stops at eider end of the drive screw the encountered. Such screw drive type linear actuators which allow the nut to rotate with the drive screw and slip relative to the drive tube the commonly said to have an "overrunning nut". The overrunning nut allows the drive shaft to be rotated after the nut has engaged the stop at either end of the linear actuator without causing damage thereto, or to the drive means or to the device upon which the actuator operates.

Various overrunning nut designs have been developed and are well known. However, these designs have not been entirely successful. Known linear actuators employing an overrunning nut have generally been complicated and expensive, highly sensitive, subject to failure, or a combination thereof. In order to function properly, it is first essential that the amount of torque needed to cause the nut to overrun, i.e., rotate in unison with the screw shaft, must always exceed the frictional torque between the drive screw and the nut. Secondly, it is important that the amount of torque needed to cause the nut to overrun does not exceed the output torque capacity of the drive means. Known screw drive type linear actuators employing an overrunning nut have failed to fulfill the above criteria. If the first requirement is not met, the nut overruns too easily, in which case the nut rotates with the drive shaft, even when it is positioned between the stops, thus resulting in failure of the drive tube to move linearly as desired upon rotation of the drive screw. If the second requirement is not met, the nut fails to overrun, causing the drive means to stall or causing mechanical failure of the actuator, drive means or device upon which the actuator operates. Even when both criteria are met, if excessive forces are required to cause the nut to overrun, premature failure and unacceptable product life can result. Some linear actuators employing the overrunning nut concept function acceptably as long as an axial load or force is applied to the nut, but fail to function properly when the axial load is removed. Other linear actuators having an overrunning nut are extremely sensitive and only function well when a particular lubricant is applied to vital surfaces, when a particular quantity of lubricant is applied to vital surfaces, or when a particular lubricant is applied in a particular quantity to vital surfaces.

SUMMARY OF THE INVENTION

The invention provides a screw type linear actuator which is simple, inexpensive, and reliable. More specifically, the invention provides a mechanical arrangement incorporating an overrunning nut which relies on a clutch mechanism, and a compression member which exerts a separating force between the clutch mechanism and the nut to ensure that the amount of torque needed to cause the nut to overrun always exceeds the frictional torque between the drive screw and the nut, irrespective of the axial load or force which is applied to the linear actuator. The invention features a robust design which is not highly dependent upon the use of a particular lubricant or specific amounts of lubricant in order to achieve proper operation, and in which the compression member can be easily designed or selected to ensure that the overrun torque is always greater than the frictional torque between the drive screw and the nut, throughout the entire range or torque and load which is anticipated, and that the overrun torque does not exceed the output torque capacity of the power source. The mechanical arrangement of the invention provides an overrunning nut design wherein the overrun torque increases as the rotational friction at the drive screw is increased by increased axial load on the actuator, to maintain a differential between the overrun torque and the torque needed to overcome rotational friction at the drive screw. This torque differential ensures that the drive tube will always be positively engaged when the drive screw is rotated with the nut located between the stops, irrespective of the axial load. This means that the actuator will operate properly at any axial load from zero up to the maximum design load. Additionally, the actuator can be designed so that the above referenced torque differential is always sufficient to achieve proper operation, yet not so high as to cause excessive fatigue and wear on components, as could otherwise result in premature failure and unacceptable product life.

The linear actuator of the invention includes a drive screw having an inboard and an outboard end, a nut disposed on and threadingly engaging external threads of the drive screw, and a reciprocating drive tube operatively coupled to the nut, whereby rotation of the drive screw normally causes linear movement of the nut and drive tube along the axis of the drive screw. The reciprocating drive tube is radially disposed over at least portion of the drive screw. An annular member is radially disposed between the drive screw and the drive tube, with a portion of the annular member being axially disposed outboard of the nut. The annular member is splined with the nut, so that rotation of the nut causes rotation of the annular member, but allows axial movement of the nut with respect to the annular member. The annular member includes an annular surface which faces towards the outboard end of the drive screw, and bears upon a complimentary annular surface which faces towards the inboard end of the drive screw. The complimentary annular surface is operatively connected to the drive tube, so that outboard movement of the nut upon rotation of the drive screw causes the annular surface on the annular member to bear upon the complimentary annular surface and urge the drive tube in a direction toward the outboard end of the drive screw. A compression member is utilized to urge the drive nut axially away from the annular member. A retainer is provided to allow limited axial movement of the nut with respect to the drive screw, so that the nut and the annular member are maintained in splined engagement. A first stop is generally disposed near the outboard end of the drive screw to limit outboard movement of the nut, the annular member and the drive tube. A second stop is generally disposed near the inboard end of the drive screw to limit inboard movement of the nut, the annular member and the drive tube.

BRIEF DESCRIPTION OF THE DRAWINGS

FIG. 1 is longitudinal cross section which illustrates the general configuration of a linear actuator in accordance with the invention, with the drive tube being fully retracted;

FIG. 2 is a longitudinal cross section of the linear actuator shown in FIG. 1, with the drive tube fully extended;

FIG. 3 is an enlarged, fragmentary cross sectionally view illustrating the mechanical arrangement of the overrunning nut design employed in the invention;

FIG. 5 is an exploded, fragmentary perspective view of the mechanical arrangement of the components of the overrunning nut design.

DESCRIPTION OF THE PREFERRED EMBODIMENT

Figure 4:
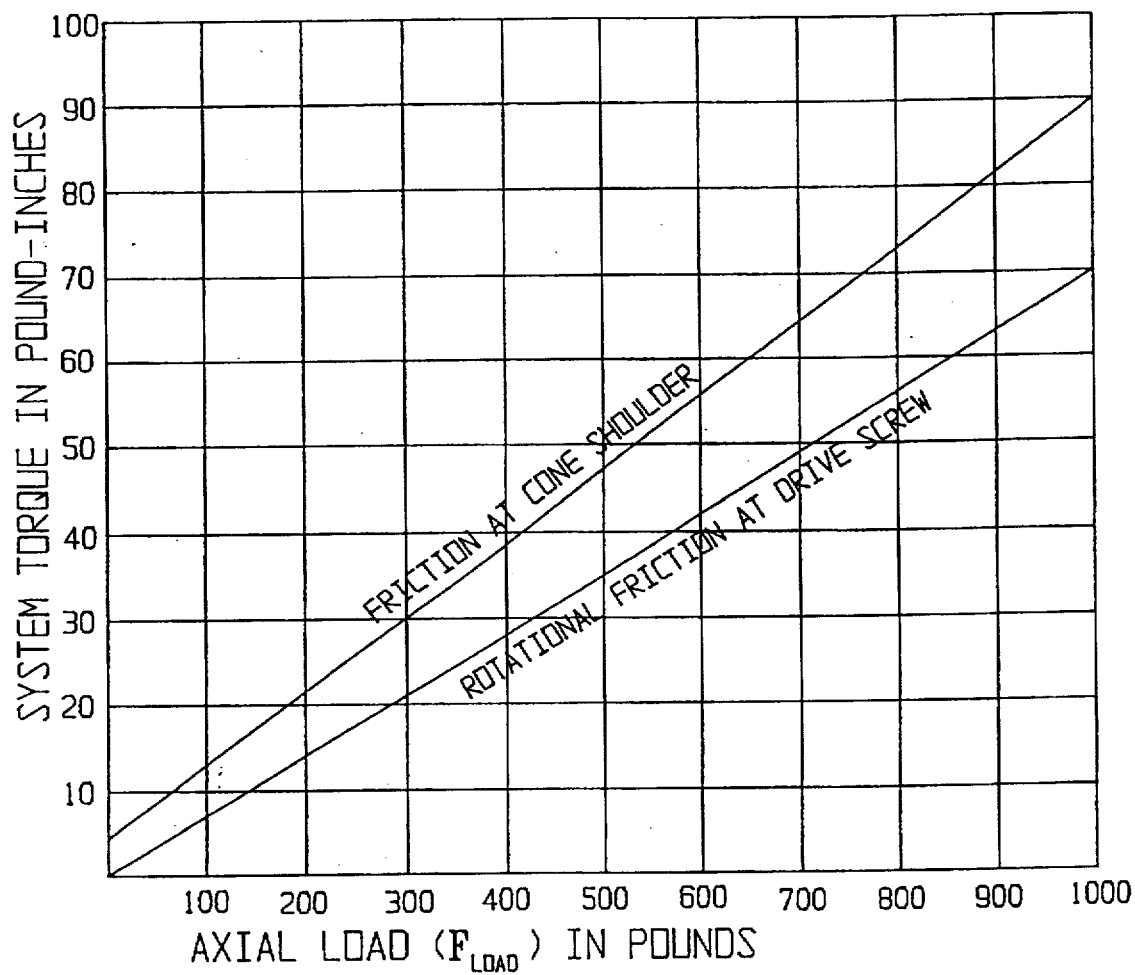
FIG. 4 is a graph showing the ideal performance characteristics of a linear actuator employing the overrunning nut design of the invention.

A linear actuator employing the overrunning nut design of the invention is shown in FIG. 1. Linear actuator 10 includes a drive screw 12 having external threads 14, and a nut 16 which is disposed on, and threadingly engages the external threads of, drive screw 12. Rotary motion can be provided by a reversible power source or drive means 18, such as an electric motor, pneumatic motor, or hydraulic motor. As an alternative, a hand crank may be utilized in certain applications if desired. For high speed drive means, it is generally desirable to transmit torque to the drive shaft through a gear box 20 which, by means of gear reductions, provides rotation to the drive screw 12. In the illustrated embodiment, drive screw 12 includes a square or hexagonal shaft end 22 which permits manual rotation of drive screw 12 in the event of failure of the drive means 18.

Gear box 20 includes a mounting block 24 into which are cast or machined mounting holes 26. Mounting block 24 and holes 26 provide means by which the stationary end of the linear actuator 10 can be mounted onto a supporting structure.

A reciprocating drive tube 28 is operatively coupled to nut 16, whereby longitudinal movement of nut 16 along drive screw 12 upon rotation thereof causes drive tube 28 to move linearly in a direction along the rotational axis of the drive screw. A dust cover tube 30 is stationarily mounted over the drive screw to protect it from dust, debris and the like. A guide spacer 32 is mounted on the outboard end of drive screw 12 to maintain proper concentric alignment between the drive screw and the drive tube. The outboard end of drive tube 28 is provided with mounting holes 34 for connecting the drive tube to an object or component of a mechanical device which is to be acted upon by the linear actuator 10.

FIG. 1 shows linear actuator 10 in the fully retracted position with nut 16 abutting inboard stop 36, with the mounting distance (designated "A" in FIG. 1) between mounting holes 26 and mounting holes 34 being at a minimum. In FIG. 2, linear actuator 10 is shown in the fully extended position with an outboard surface of a first clutch member 38, which is operatively coupled to nut 16, abutting an outboard stop 40. When linear actuator 10 is in the fully extended position, the mounting distance (designated "B" in FIG. 2) between mounting holes 26 and mounting holes 34 is at a maximum. The difference between the fully extended mounting distance and the fully retracted mounted distance (B minus A) is the effective stroke of the actuator. The stroke can be increased or decreased by changing the length of drive screw 12.

The mechanical arrangement of the overrunning nut design employed in the invention is shown in greater detail in FIGS. 3 and 5. Clutch member 38 is radially disposed between drive screw 12 and drive tube 28. An inboard portion 42 of clutch member 38 is radially disposed between a portion of nut 16 and drive tube 28. Nut 16 and clutch member 38 are splined together at the interface between the outer circumferential wall of nut 16 and the inner circumferential wall of inboard portion 32 of clutch member 38, so that rotation of the nut causes rotation of the first clutch member, while allowing axial movement of the nut with respect to the first clutch member. In the illustrated embodiment, longitudinal splines 44 are provided on the outer circumferential wall of nut 16, and engage keyways (not shown) on the inner circumferential wall of inboard portion 42 of clutch member 38. Various alternative spline arrangements which would provide rotational engagement between nut 16 and clutch member 38, while allowing axial movement of the nut with respect to the first clutch member, are possible and would be equally acceptable. Clutch member 38 also includes an outboard portion 46 having a first clutch surface 48 which faces toward the outboard end of the drive screw. In the illustrated embodiment, and preferably, clutch surface 48 is conical and inclines radially outwardly toward the inboard end of drive screw 12. Clutch surface 48 of clutch member 38 bears against a second, complimentary clutch surface 50 which faces toward the inboard end of drive screw 12. Complimentary clutch surface 50 is disposed on a second clutch member 52 which is disposed axially outboard of annular member 38. Clutch member 52 is retained in abutment with clutch member 38 by an inwardly projecting circumferential indentation 54 on drive tube 28 and by a compression member, such as a helical spring 56, which urges clutch member 38 axially away from nut 16 and against clutch member 52. A retainer 58 allows limited axial movement of nut 16 with respect to drive screw 12, whereby nut 16, clutch member 38, clutch member 52 and helical spring 56 are retained within a portion of drive tube 28 by means of indentation 54 and retainer 58. Retainers 58 are positioned within openings 60 in drive tube 28, and are held in position by the inside surface of sleeve or dust cover tube 30. The dimensions of openings 60 in the axial direction of linear actuator 10 is greater than the axially directed dimension of the portion of each of the retainers 58 whereby a small amount of axial movement of nut 16 with respect to drive shaft 28 is permitted. The mount of axial movement of nut 16, with respect to screw drive 12 which is permitted, is not sufficient to affect the splined engagement of nut 16 with clutch member 38, or sufficient to prevent clutch surfaces 48 and 50 from bearing upon each other. Retainers 58 each include a radially inwardly directed projection 62 which engages a recess 64 in nut 16. In the illustrated embodiment, recess 64 is a circumferential groove so as to permit rotation of the nut 16 during overrun mode.

While the illustrated embodiment includes a clutch member 52 which is separate from, but in assembled engagement with, drive tube 28, a complimentary surface 50 can be formed directly into drive tube 28, eliminating need for a separate clutch member 52. Forming complimentary clutch surface 50 directly on drive tube 28 to eliminate the need for a separate clutch member 52 is a particularly attractive alternative for lighter duty applications.

Under load conditions, an axial force exerted on drive tube 28 is transmitted through indentation 54 to clutch member 52, and to clutch member 38 through complimentary clutch surfaces 48 and 50. The axial force is then transmitted to drive nut 16 through abutting surfaces 66 and 68 of clutch member 38 and nut 16, respectively. The axial load is then transmitted to drive screw 12 through threads 14, and to gear box 20.

The value of the torque for overrun is determined primarily by the interaction between the clutch surfaces 48 and 50. The friction and torque characteristics of the nut 16 and drive screw 12 are dependent upon the materials of which nut 16 and drive screw 12 are made, thread dimensions, drive screw diameter, surface finishes, lubricants, etc. Of greater importance however, in determining the overrun torque for linear actuator 10 is the angle (designated "C" in FIG. 3) of the clutch surfaces 48 and 50 with respect to the longitudinal direction of the actuator. As the angle C is made shallower or smaller, there will be a greater tendency for the two surfaces to bind, and greater resistance to rotation between the first clutch member 38 and the second clutch member 52. Accordingly, the desired differential between the overrun torque and the torque needed to overcome rotational friction between nut 16 and drive screw 12 can be controlled in a predictable manner by selecting an appropriate angle or inclination of clutch surfaces 48 and 50 with respect to the axis of rotation of drive screw 12.

As mentioned earlier, a common failure with many of the known overrunning nut designs is their inability to function properly with all loads removed. The invention features a permanent frictional load which is imposed by means of a compression member such as a helical spring 56 which exerts a force in the outboard direction against clutch member 38, and a reactive force in the inboard direction against nut 16. The force from the compression member eventually bears against clutch surfaces 48 and 50 and against retainer 58. The value of this permanent resistance to rotation can be increased or decreased by adjusting the amount of spring force tending to separate nut 16 and clutch member 38. The compression member can be a wound spring or spiral spring (as shown) or an elastomeric component, or the like, which exerts a constant or variable separating force between nut 16 and clutch member 38. The compression member can also take the form of other types of adjustable compression devices such as, but limited to those actuated by a hydraulic or pneumatic mechanism.

In operation, when rotational motion is applied to drive screw 12 under no-load conditions, friction forces between the external threads of drive screw 12 and the internal threads of nut 16 tend to induce the nut 16 to rotate in unison with drive screw 12. Separating forces exerted by compression member 56 cause internal friction at the interface between clutch surfaces 48 and 50. This internal, rotational friction prevents nut 16 from rotating freely and it proceeds outbound along drive screw 12. Outboard directed motion is transmitted from nut 16 from load bearing face 68 to face 66, through clutch member 38, from clutch surface 48 to clutch surface 50, through clutch member 52 and to drive tube 28 through indentations 54. Stop pins 36 and 40 which projected radially outwardly from drive screw 12 define the limits of travel of nut 16 and drive tube 28. In the outboard direction contact with stop 40 is made by stop surface 70 on the outboard end of clutch member 38. In the reverse direction (inboard direction), contact with the inboard stop 36 is made by a stop surface 72 on the inboard end of nut 16. When contact is made with either stop, nut 16 and clutch member 38 are forced to rotate in unison with drive screw 12, and all axial motion stops, even though the drive screw may continue to rotate. The power source or drive means 18 will be subjected to a sudden increase in load when contact is made with either of the stops 36, 40, because the torque required for overrun is necessarily higher than the normal load-lifting frictional torque needed to drive the system comprising the actuator and the object or component which is to be acted upon by the actuator. However, as long as overrun torque is lower than stall torque, the mechanism will function acceptably and without any adverse consequences.

FIG. 4 illustrates the ideal performance characteristics for an overrunning nut in accordance with the invention. The illustrated performance characteristics are for a linear actuator designed to raise and lower a load which can vary between 0 and 1,000 pounds, using a motor having a stall torque of 100 or more pounds-inches. As illustrated, the rotational friction at the drive screw is directly proportional to the axial load, and varies from 0 to 70 pound-inches throughout the load range. With motor stall torque exceeding 100 pound-inches, the motor is capable of driving the linear actuator under all anticipated axial loads. In accordance with the invention, the amount of torque required for the nut to overrun or slip, is generally directly proportional to the axial load, and is determined primarily by the design of the cone-shaped load bearing shoulder or annular surface. As shown in FIG. 1, with the invention, the friction at the cone shoulder, i.e., the torque at which the nut will overrun at any given axial load, varies from 5 to 90 pound-inches throughout the load range. Notably with the overrunning nut design of the invention, friction at the cone shoulder never reaches zero. The result is that there is always frictional load on the cone shoulder which assures that the nut will commence linear travel on the screw, even under no-load conditions. At maximum axial load (1,000 pounds) the cone shoulder can be designed so that maximum torque for overrun is lower than the 100 pound-inch capacity of the motor. Even at maximum system load, the motor will not be damaged or stall. When sufficient axial load is applied to the linear actuator clutch member 38 directly abuts nut 16 so that force is transmitted directly between the clutch member 38 and the nut 16, rather than through the compression member 56. Another characteristic of the invention is that throughout the entire range of torque and load, overrun torque is always greater than fractional torque at the screw.

With careful design, the differential between the two values can be made to increase with load, thereby providing an ever increasing margin of safety as loads rise. This provides assurance that the system will always positively drive and will not improperly slip or overrun.

The embodiments of the invention in which, an exclusive property or privilege is claimed are defined as follows:

1. A linear actuator for articulated beds, comprising:

a drive screw having an inboard end, an outboard end, and external threads;

a nut disposed on and threadingly engaging the external threads of said drive screw;

a reciprocating drive tube radially disposed over at least a portion of said drive screw;

a first clutch member disposed operably between said nut and said drive tube, and being splined with said nut, whereby rotation of said nut causes rotation of said first clutch member while allowing axial movement therebetween; said first clutch member including a first clutch surface which faces toward the outboard end of said drive screw;

a second clutch member disposed operably between said first clutch member and said drive tube, and being connected with said drive tube for rotation therewith; said second clutch member including a second clutch surface which faces towards the inboard end of drive screw, and engages the first clutch surface of said first clutch member, whereby outboard movement of said nut upon rotation of said drive screw urges said drive tube in a direction toward the outboard end of said drive screw;

a compression member urging the first clutch surface of said first clutch member into frictional engagement with the second clutch surface of said second clutch member;

a first stop generally disposed near the outboard end of said drive screw which limits outboard movement of said nut, and said drive tube; and a second stop generally disposed near the inboard end of said drive screw which limits inboard movement of said nut, and said drive tube.

2. The linear actuator of claim 1, wherein said compression member exerts sufficient force to ensure that the torque friction at the interface between the first clutch surface and the second clutch surface exceeds the torque friction between the drive screw and the nut.

3. The linear actuator of claim 2, further comprising a motor for transmitting torque to said drive screw, and wherein the torque friction at the interface between the first clutch surface and the second clutch surface is less than the stall torque of the motor.

4. The linear actuator of claim 1, wherein said first clutch surface of said first clutch member is conical, and inclined radially outwardly toward the inboard end of said drive screw.

5. The linear actuator of claim 1, wherein said second clutch member is an integral portion of said drive tube.

6. The linear actuator of claim 1, wherein said compression member is an adjustable compression device.

7. The linear actuator of claim 1, wherein said second clutch member is retained in abutment with said first clutch member by said compression member and an inwardly projecting indentation on said drive tube.

8. The linear actuator of claim 1, wherein said compression member is disposed within an annular space between said nut and said drive tube.

9. The linear actuator of claim 1, wherein said compression member is a helical spring.

10. The linear actuator of claim 9, wherein said stops project radially outwardly from said drive screw.

11. The linear actuator of claim 1, further comprising a stationary tubular sleeve disposed over said drive screw radially outwardly of said drive tube.

12. The linear actuator of claim 1, wherein said compression member is retained in a portion of said drive tube by a retainer which includes a portion disposed within an opening in the wall of said drive tube and a projection directed radially inwardly of said drive tube, and wherein said projection engages a recess in said nut.

13. A linear actuator comprising:

a drive screw having an inboard end and an outboard end;

a nut disposed on, and threadenly engaging external threads of, said drive screw;

a reciprocating drive tube radially disposed over at least a portion of said drive screw;

a first clutch member disposed operatively between said nut and said drive tube, and being splined with said nut, whereby rotation of said nut causes rotation of said annular member while allowing axial movement of said nut with respect to said annular member, said first clutch member including a conical clutch surface which faces toward the outboard end of said drive screw and inclines radially outwardly toward the inboard end of said drive screw;

a second clutch member hiring a complimentary conical clutch surface which faces toward the inboard end of said drive screw, said complimentary annular conical clutch surface being operatively connected to said drive tube, whereby outboard movement of said nut upon rotation of said drive screw causes said conical clutch surface on said first clutch member to bear upon said complimentary conical clutch surface and urge said drive tube in a direction toward the outboard end of said drive screw;

a compression member urging the first clutch surface of said first clutch member into frictional engagement with the second clutch surface of said second clutch member;

a retainer which allows limited axial movement of said nut with respect to said drive screw, whereby said nut and said first clutch member are maintained in splined engagement;

a first stop generally disposed near the outboard end of said drive screw to limit outboard movement of said nut, said first clutch member and said drive tube; and a second stop generally disposed near the inboard end of said drive screw to limit inboard movement of said nut, said first clutch member and said drive tube.

14. The linear actuator of claim 13, wherein said compression member exerts sufficient force to ensure that the torque friction at the interface between the first clutch surface and the second clutch surface exceeds the torque friction between the drive screw and the nut.

15. The linear actuator of claim 14, further comprising a motor for transmitting torque to said drive screw, and wherein the torque friction at the interface between the first clutch surface and the second clutch surface is less than the stall torque of the drive means.

16. The linear actuator of claim 13, wherein the first clutch member can directly abut the nut when a sufficient axial load is applied to the linear actuator, so that force is transmitted directly between the first clutch member and the nut, rather than through the compression member.

17. The linear actuator of claim 13, wherein said second clutch member is an integral portion of said drive tube.

18. The linear actuator of claim 13, wherein said second clutch member is a separate part from said drive tube.

19. The linear actuator of claim 18, wherein said second clutch member is retained in abutment with said first clutch member by said compression member and an inwardly projecting indentation on said drive tube.

20. The linear actuator of claim 18, wherein said compression member is a helical spring.

21. The linear actuator of claim 20, further comprising a stationary tubular sleeve disposed over said drive screw radially outwardly of said drive tube.

22. The linear actuator of claim 21, wherein said compression member is retained in a portion of said drive tube by a retainer which includes a portion disposed within an opening in the wall of said drive tube and a projection directed radially inwardly of said drive tube, and wherein said projecting engages a recess in said nut.

23. The linear actuator of claim 22, wherein said stops project radially outwardly from said drive screw.

* * * * *

UNITED STATES PATENT AND TRADEMARK OFFICE
CERTIFICATE OF CORRECTION

PATENT NO. : 5,673,593
DATED : October 7, 1997
INVENTOR(S) : Scott G. Lafferty

It is certified that error appears in the above-identified patent and that said Letters Patent is hereby corrected as shown below:

In the Abstract, lines 6 and 10;
   "complimentary" should be --complementary--.

Column 1, line 26;
   "it" should be --is--.

Column 1, line 30;
   After "such", insert --as--.

Column 1, line 38;
   After "such", change "an" to --as--.

Column 1, line 42;
   "the" should be --are--.

Column 1, line 44;
   "complexion" should be --complexity--.

UNITED STATES PATENT AND TRADEMARK OFFICE
CERTIFICATE OF CORRECTION

PATENT NO. : 5,673,593
DATED : October 7, 1997
INVENTOR(S) : Scott G. Lafferty

It is certified that error appears in the above-identified patent and that said Letters Patent is hereby corrected as shown below:

Column 1, line 50;
    "eider" should be --either--.

Column 1, line 50;
    After "screw", "the" should be --are--.

Column 1, line 53;
    After "tube", "the" should be --are--.

Column 3, lines 11, 13, and 17;
    "complimentary" should be --complementary--.

Column 3, line 35;
    "cross sectionally" should be --cross-sectional--.

UNITED STATES PATENT AND TRADEMARK OFFICE
CERTIFICATE OF CORRECTION

PATENT NO. : 5,673,593
DATED : October 7, 1997
INVENTOR(S) : Scott G. Lafferty

It is certified that error appears in the above-identified patent and that said Letters Patent is hereby corrected as shown below:

Column 4, line 53;
"complimentary" should be --complementary--.

Column 4, line 55;
"Complimentary" should be --Complementary--.

Column 5, lines 18, 20, and 26;
"complimentary" should be --complementary--.

Column 8, claim 13, line 16;
"threadenly" should be --threadedly--.

Column 8, claim 13, lines 23 and 24;
"annular" (both occurences) should be --first clutch--.

UNITED STATES PATENT AND TRADEMARK OFFICE
CERTIFICATE OF CORRECTION

PATENT NO. : 5,673,593
DATED : October 7, 1997
INVENTOR(S) : Scott G. Lafferty

It is certified that error appears in the above-identified patent and that said Letters Patent is hereby corrected as shown below:

Column 8, claim 13, line 29;
 "hiring" should be --having--.

Column 8, claim 13, lines 29, 31, and 36;
 "complimentary" should be --complementary--.

Column 10, claim 22, line 9;
 "projecting" should be --projection--.

Signed and Sealed this

Seventeenth Day of February, 1998

*Attest:*

BRUCE LEHMAN

*Attesting Officer*    *Commissioner of Patents and Trademarks*